C. Liebrich,
Trunk Lock.
No. 4,170. Reissued Nov. 1. 1870.
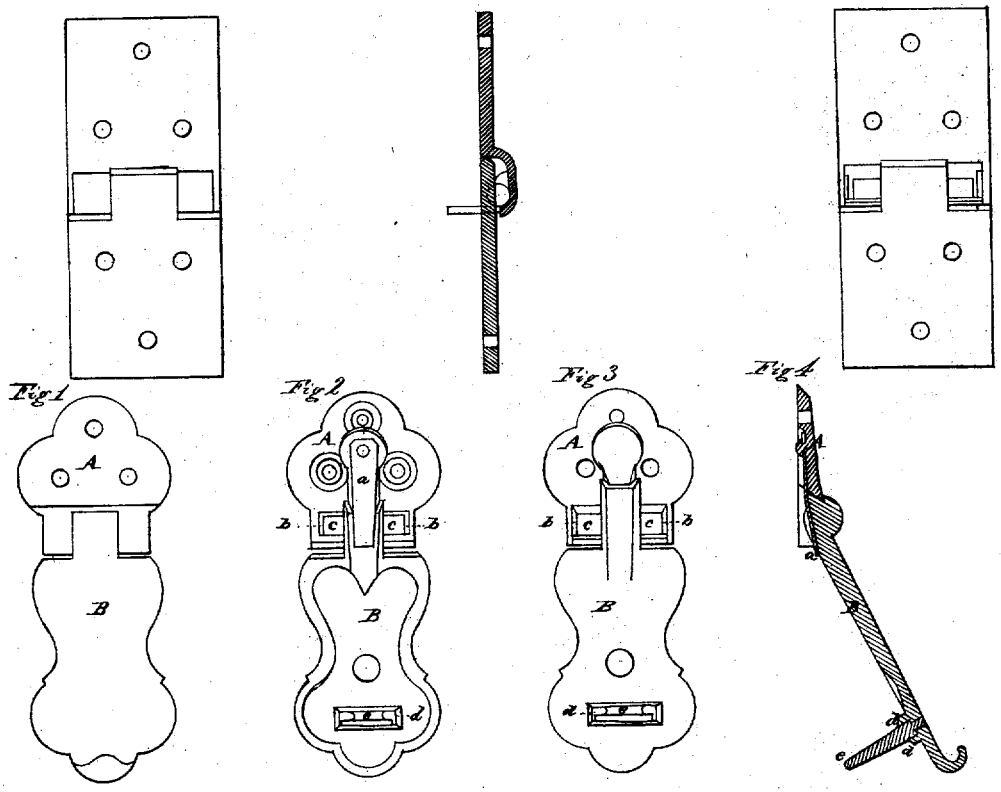
Witnesses.
M. H. Kinckel
F. J. Dayton
Inventor.
Conrad Liebrich.
by Wiedersheim & Norris.
Its Attys.
N. PETERS, PHOTO-LITHOGRAPHER, WASHINGTON, D. C.

United States Patent Office.

SAMUEL CROFT AND JOHN C. SCHUELLERMANN, OF PHILADELPHIA, PENNSYLVANIA, EXECUTORS OF CONRAD LIEBRICH, DECEASED.

Letters Patent No. 10,862, dated May 2, 1854; extended seven years; reissue No, 4,170, dated November 1, 1870.

IMPROVEMENT IN HASPS FOR TRUNK-LOCKS.

The Schedule referred to in these Letters Patent and making part of the same.

*To all whom it may concern:*

Be it known that CONRAD LIEBRICH, of the city and county of Philadelphia, and State of Pennsylvania, invented new and useful Improvements in Hasps for Trunks and other Locks; and we do hereby declare the following to be a clear and exact description of the nature thereof, sufficient to enable others skilled in the art to which the invention appertains to fully understand and use the same, reference being had to the accompanying drawing making part of this specification, in which—

Figure 1 is a front view of the hasp.

Figure 2 is a rear view thereof.

Figure 3 is a similar view, the spring having been removed.

Figure 4 is a central transverse vertical section.

Similar letters of reference indicate corresponding parts in the several figures.

It is well known that hasps for trunks and other articles have been made with hinges, but in all these heretofore made the hinges were not controlled, and the consequence was that when the lid of the trunk dropped shut the catch of the hasp would strike against the trunk-frame, and frequently break them off, and thus cut or damage the trunk.

Another difficulty with the uncontrolled hinge, when applied to self-locking locks, is that, when the lid of the trunk drops, it is frequently locked by the jar of such accidental dropping.

Another disadvantage is that, when the lock is unlocked, the hasp-catch remains in the lock, and is quite difficult of removal, especially when self-closing locks are employed.

Another objection to the present form of hasps is, that the strain or tendency of the lid to open comes entirely upon the catch, which, being slight and riveted to the hasp, is not capable of sustaining any very great force.

This invention is designed to remedy these serious objections, and may be said to consist in, first, the application of a spring to one part of a hasp, and pressing or so acting against the other part as that the hinged portion of the hasp will always stand in such inclined position as to avoid striking the trunk-frame in letting down the lid; further, to prevent the hasp-catch from entering the lock until pressed in against the action of the spring, and also to cause the hasp-catch to fly out from the lock when the lock is unlocked or opened.

It next consists in the peculiar construction of the hinge of the hasp.

It finally consists in setting the hasp-catch in a solid projection cast with the hasp, which projection enters the lock sufficiently far to receive the strain or tendency of the lid to open, thus taking the force from the catch itself, and transferring it to the solid metal, which makes the hasp more substantial and less liable to be forced open.

In the drawing—

A B represent the two parts of a hasp, which, for the purpose of lightness, may be cast hollow on the under side, as seen by the dotted lines in fig. 2.

To one part of the hasp is attached a spring, *a*, which presses against the other part, so that the lower part will always, unless the hasp is locked, stand as represented in fig. 4.

It will thus be seen that the hinged portion of the hasp will always stand in such inclined position as to avoid striking the trunk-frame in letting down the lid.

The hasp-catch is prevented from entering the lock until pressed in against the action of the spring.

In unlocking, it is only necessary to turn the key and the hasp-catch flies out of the lock itself without manual assistance.

To those who have attempted to hold back the lock-bolt of a spring or self-locking lock, with a key in one hand, to draw and hold out the hasp-catch with the other, and then raise the lid of the trunk, the convenience of the spring hasp will be very obvious.

Another feature of this invention consists in the formation of the hinge of the hasp.

On one part of the hasp A B there are cast or formed recesses *b b*, which form bearings or sockets for journals or trunions *c c*, cast or wrought on the other part of said hasp, which trunnions and recesses form the hinge of the hasp.

The pivot of the hinge being solid or fast to its respective part, and the ordinary hinging-pin being dispensed with when the hasp is secured in place, the hinge or joint cannot be separated without boring clear through the journals from outside to outside. This is important, inasmuch as in ordinary hasps the joint or hinge is a weak point, and often successfully assailed by burglars.

In fig. 4, there is shown a mode of strengthening and protecting the hasp-catch.

*d* represents a projection, which is cast solid with the part B of the hasp, the catch *e* being riveted to it, as seen in the drawing.

This projection *d* enters the lock or the escutcheon far enough to catch against the lock-plate and take the strain incident to the rising of the trunk-lid onto the solid metal, and relieve the catch *e* from a force which it is not well calculated to withstand.

What is herein claimed as the invention of CONRAD LIEBRICH (now deceased) is—

1. The combination, with a hinged hasp, of a spring for throwing out the lower or hinged portion thereof, substantially as described.

2. The combination, with a hasp, of the solid trunnions *c* and recesses *b*, substantially as and for the purpose described.

3. The hasp-catch, secured to a solid projection on the hinged portion of the hasp, substantially as and for the purpose described.

SAML. CROFT.
JOHN CHARLES SCHUELLERMANN.

Witnesses:
JOHN A. WIEDERSHEIM,
ROBERT. R. SMITH.